April 21, 1959     W. D. ANDERSON     2,883,245
RETAINER FOR ANTI-FRICTION BEARINGS Filed Nov. 28, 1956     3 Sheets-Sheet 1

*INVENTOR.*
WARREN D. ANDERSON
BY John P. Chandler
HIS ATTORNEY.

April 21, 1959     W. D. ANDERSON     2,883,245
RETAINER FOR ANTI-FRICTION BEARINGS Filed Nov. 28, 1956     3 Sheets-Sheet 2

*INVENTOR.*
WARREN D. ANDERSON
BY John P. Chandler
HIS ATTORNEY.

April 21, 1959 W. D. ANDERSON 2,883,245
RETAINER FOR ANTI-FRICTION BEARINGS
Filed Nov. 28, 1956 3 Sheets-Sheet 3
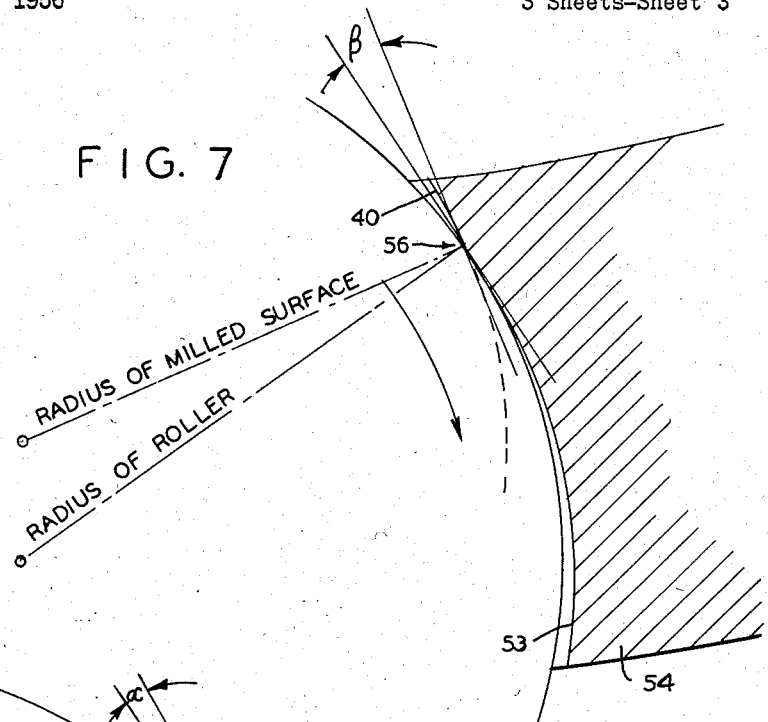
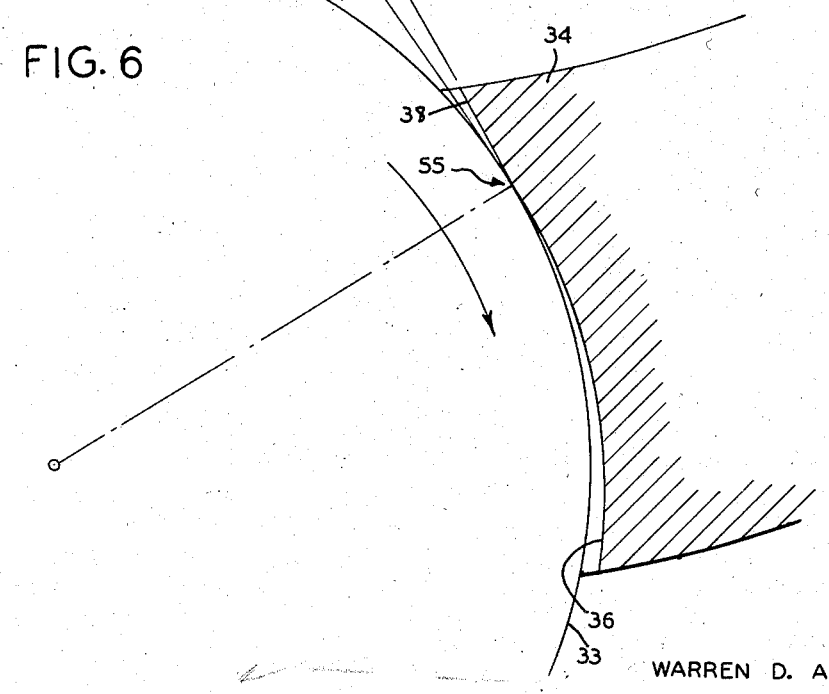
INVENTOR.
WARREN D. ANDERSON
HIS ATTORNEY.

United States Patent Office

2,883,245
Patented Apr. 21, 1959

2,883,245

RETAINER FOR ANTI-FRICTION BEARINGS

Warren D. Anderson, Glenbrook, Conn., assignor to Norma-Hoffmann Bearings Corporation, Stamford, Conn., a corporation of New York Application November 28, 1956, Serial No. 624,914

5 Claims. (Cl. 308—217)

This invention relates to retainers for the rolling elements of anti-friction bearings and relates more particularly to retainers which are supported by the rolling elements rather than by either the outer or the inner race ring.

An important object of the present invention is to provide more efficient lubrication between a bearing retainer or separator and the rolling elements than has heretofore been possible. This is accomplished by the use of a lubricant wedge by means of which the lubricant is fed to the surfaces in contact in such a way as to provide a positive film of lubricant at the point or in the area of greatest pressure between the rolling element and the pocket of the retainer. For such high-speed applications of bearings, as in jet engines, turbo-superchargers and motors for diesel electric locomotives, such a lubricant film is most desirable in order to avoid high temperature and wear.

The use of wedge-shaped openings between shafts and bearings is known, but when use is made of such a lubricant wedge in connection with retainers and rolling elements of anti-friction bearings, certain critical factors, such as the optimum angle of the wedge shaped opening, have been discovered. Considerable research has proven that the exact details of the lubricant wedge, particularly the angle of the two faces of the wedge, are of utmost importance. If this angle is either too small or too large a continuous lubricant film is not maintained between the contacting surfaces which results in the bearing heating up.

For purpose of illustrating the action between rolling elements and the retainer pockets therefor, a cylindrical roller bearing having cylindrical rolling elements has been chosen. However, the same action will result if other forms, such as tapered, barrel-shaped, or spherical-rolling elements, are used.

In the accompanying drawings:

Fig. 6 is a section of a retainer showing the lubricant wedge having a straight side.

Fig. 7 is a section of a retainer showing the lubricant wedge with a curved side.

Figure 1:
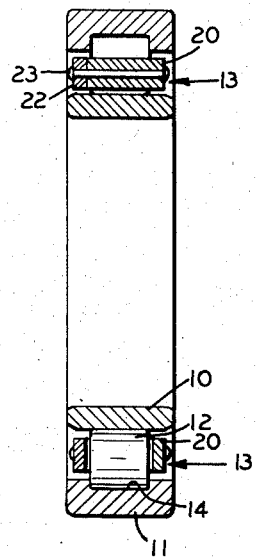
Fig. 1 is a central section taken through a cylindrical roller bearing of the type to which this invention pertains and which has a machined retainer supported by the rollers.
Figure 2:
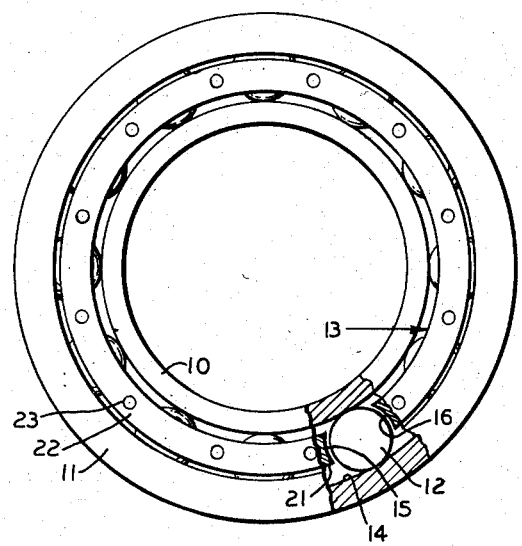
Fig. 2 is a side elevation of the roller bearing shown in Fig. 1 with a portion of the retainer and the inner and outer races broken away to show the retainer supported by a roller.

The roller bearing shown in Figs. 1 and 2 includes an inner race ring 10, an outer race ring 11, a plurality of spaced cylindrical roller elements 12, and a retainer 13. The outer race is shown as provided with an annular recess 14 limiting axial movement of the rollers.

The retainer which maintains the equal spacing of the rollers is an annulus of greater width than the length of the rollers and has a plurality of spaced pockets machined therein, one for each roller. Each pocket is formed with two opposed concave walls 15 and 16 which forms arcs of a circle only slightly larger than the roller. The length of the pocket is slightly greater than the length of the rollers and there remains a ring-like portion 20 forming a rigid integral support for the blocks 21 separating each pocket. The opposed end walls of the blocks have the concave surface 16—15 therein. A ring 22 secured by headed rivets 23 completes the retainer.

The present invention appertains only to this type of retainer which is supported by the rolling elements rather than a retainer supported by the inner ring or by the outer ring.

Figure 3:
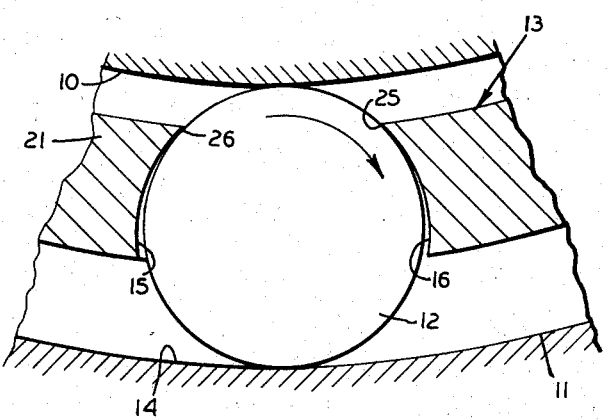
Fig. 3 is an enlarged section of the roller-supported retainer shown in Fig. 2.

As shown in Fig. 2, there is a clearance between the rollers and the roller pockets in the retainer. This clearance is shown as being uniformly disposed around the roller. However, when the bearing is rotating, any slight unbalance of the retainer will cause it to be thrown off its true center due to centrifugal force. Its movement is then restrained by contact between the roller and the edge of the roller pocket, as shown in Fig. 3. This results in a high unit pressure at points 25 and 26. When the roller is rotating in the direction shown, any lubricant tending to enter the space between the roller and this edge surface at point 25 is scraped off, resulting in boundary lubrication and metal-to-metal contact. Point 26 is well lubricated, as the result of the wedge-shaped opening between the roller and the pocket. When the roller is rotating in the opposite direction, the conditions are reversed.

Figure 4:
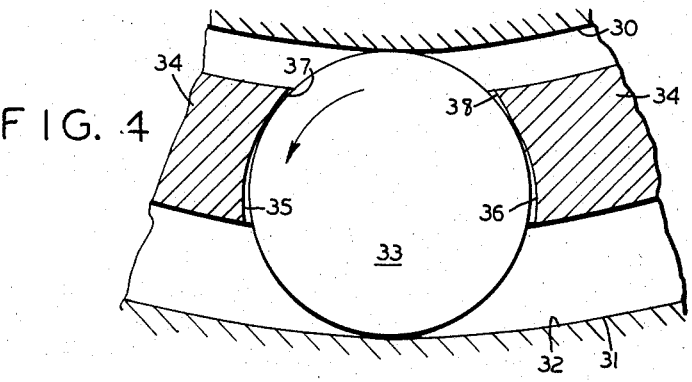
Fig. 4 is an enlarged section of a similar retainer, but with the lubricant wedge of the present invention at the inner side of the roller pocket.

A specific embodiment of the present invention is shown in Fig. 4 which illustrates the inner ring 30, the outer ring 31 with its annular channel 32 for the rollers 33 and the spaced blocks 34 of the separator-retainer with their opposed concave faces 35 and 36 forming the pockets. The upper ends of concave faces are relieved or cut away at 37 and 38 forming the lubricant wedge spaces illustrated.

When this wedge space is formed in the manner taught herein the lubricant is not scraped off but instead forms a hydrodynamic lubricating film at the high pressure area. Since the roller may rotate in either direction, the lubricant wedge is, of course, provided for at both points 37 and 38. The details of this wedge space are of prime importance, particularly the angle of the wedge. This will be demonstrated hereinafter by curves which were developed from actual testing.

Figure 5:
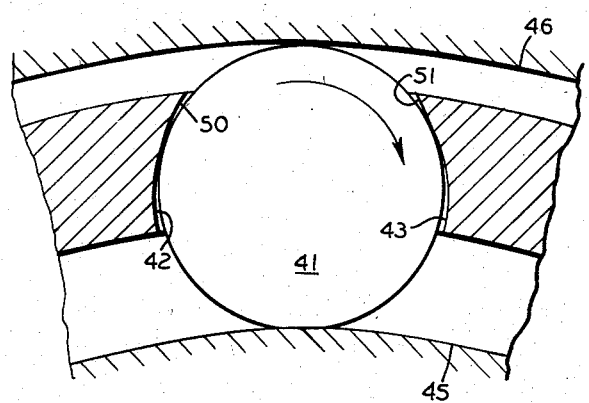
Fig. 5 is an enlarged section of a retainer with a lubricant wedge at the outer side of the roller pocket.

Depending upon the design of the roller supported retainer, the high-pressure contact may be located near the bore of the retainer, as at 37 and 38 in Fig. 4, or it may be located near the outer periphery of the retainer. This latter arrangement is shown in Fig. 5 wherein the retainer pocket defined by concave walls 42 and 43 is supported by rollers 41. The inner race is shown at 45 and the outer race at 46. In this instance the wedge space is formed by relieving or cutting away the faces 42 and 43 at 50 and 51.

The illustration shown in Fig. 6 is a greatly enlarged section of the retainer shown in Fig. 4. Here the wedge has a straight side at 38. In Fig. 7 the wedge has a curved side 40 as created by a milling cutter having a radius somewhat smaller than the radius of the concave wall 53 in the block 54 of the retainer. The significant angle α of the wedge in Fig. 6 is the angle between a line tangent to the roller at the point of contact 55 and the wedge surface 38 of the retainer itself.

In the case of the wedge with the curved side wall, shown in Fig. 7, the significant angle $\beta$ of the wedge is the angle between a line tangent to the roller at the point of contact 56 and a line tangent to the curvature of the milled surface, at the same point.

Figure 8:
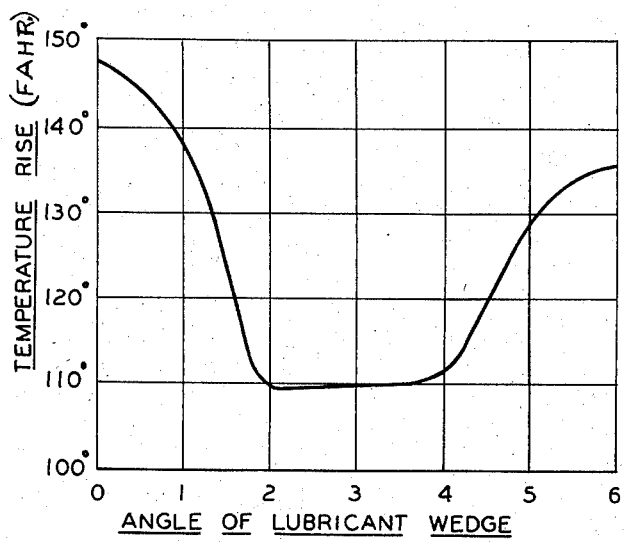
Fig. 8 is a graph showing the relationship between the angle of the lubricant wedge and the temperature, as developed from actual tests.

A considerable number of tests were conducted to find the optimum angle $\alpha$ or $\beta$ of the lubricant wedge from the standpoint of reducing the temperature of operation. Data obtained from these tests have been plotted in Fig. 8 to show the temperature rise in relation to the angle $\alpha$ or $\beta$. It was found that if the angle $\alpha$ or $\beta$ is smaller than 2°, or larger than 4°, the lubricant did not establish a continuous hydrodynamic film at the lubricant wedge. The very rapid temperature rise below 2° and again above 4° is shown clearly by the curve.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. The combination with a plurality of rolling elements for an anti-friction bearing, of a retainer which is supported by the rolling elements and which retains them in spaced relation, said retainer comprising an annulus provided with a plurality of spaced contact blocks, each adjoining pair of which having opposed curved concave surfaces conforming to the curvature of the rolling elements and forming a pocket for each element, each said curved surface having at one end thereof a portion which is cut away and forming, with the periphery of the rolling element, a wedge-shaped opening, the cut-away portion forming an inclined surface extending across the pocket of the retainer, said surface forming an angle of not less than 2° and not more than 4° with a surface tangent to the rolling element at the apex of the wedge-shaped opening, said opening permitting the formation of a hydrodynamic film of lubricant at the contact surface between the rolling element and the retainer pocket.

2. The combination with a plurality of rolling elements for an anti-friction bearing, of a retainer which is supported by the rolling elements and which retains them in spaced relation, said retainer comprising an annulus provided with a plurality of spaced contact blocks, each adjoining pair of which having opposed curved concave surfaces conforming to the curvature of the rolling elements and forming a pocket for each element, each said curved surface having adjacent to the juncture of the pocket curvature with the bore of the retainer a portion which is cut away and forming, with the periphery of the rolling element, a wedge-shaped opening, the cut-away portion forming an inclined surface extending across the pocket of the retainer, said surface forming an angle of not less than 2° and not more than 4° with a surface tangent to the rolling element at the apex of the wedge-shaped opening, said opening permitting the formation of a hydrodynamic film of lubricant at the contact surface between the rolling element and the retainer pocket.

3. The combination with a plurality of rolling elements for an anti-friction bearing, of a retainer which is supported by the rolling elements and which retains them in spaced relation, said retainer comprising an annulus provided with a plurality of spaced contact blocks, each adjoining pair of which having opposed curved concave surfaces conforming to the curvature of the rolling elements and forming a pocket for each element, each said curved surface having adjacent to the juncture of the pocket curvature with the outer periphery of the retainer a portion which is cut away and forming, with the periphery of the rolling element, a wedge-shaped opening, the cut-away portion forming an inclined surface extending across the pocket of the retainer, said surface forming an angle of not less than 2° and not more than 4° with a surface tangent to the rolling element at the apex of the wedge-shaped opening, said opening permitting the formation of a hydrodynamic film of lubricant at the contact surface between the rolling element and the retainer pocket.

4. The combination with a plurality of rolling elements for an anti-friction bearing, of a retainer which is supported by the rolling elements and which retains them in spaced relation, said retainer comprising an annulus provided with a plurality of spaced contact blocks, each adjoining pair of which having opposed curved concave surfaces conforming to the curvature of the rolling elements and forming a pocket for each element, each said curved surface having adjacent the juncture of the pocket curvature with the bore of the retainer a portion which is cut away and forming, with the periphery of the rolling element, a wedge-shaped opening, the cut-away portion forming a curved cylindrical surface extending across the pocket of the retainer, said surface forming an angle of not less than 2° and not more than 4° between a plane tangent to the rolling element and a plane tangent to the curvature of the cylindrical cut-away portion at the apex of the wedge-shaped opening, said opening permitting the formation of a hydrodynamic film of lubricant at the contact surface between the rolling element and the retainer pocket.

5. The combination with a plurality of rolling elements for an anti-friction bearing, of a retainer which is supported by the rolling elements and which retains them in spaced relation, said retainer comprising an annulus provided with a plurality of spaced contact blocks, each adjoining pair of which having opposed curved concave surfaces conforming to the curvature of the rolling elements and forming a pocket for each element, each said curved surface having adjacent to the juncture of the pocket curvature with the outer periphery of the retainer a portion which is cut away and forming, with the periphery of the rolling element, a wedge-shaped opening, the cut-away portion forming a cylindrical relief surface extending across the pocket of the retainer, said surface forming an angle of not less than 2° and not more than 4° between a plane tangent to the rolling element and a plane tangent to the curvature of the cylindrical relief at the apex of the wedge-shaped opening, said opening permitting the formation of a hydrodynamic film of lubricant at the contact surface between the rolling element and the retainer pocket.

References Cited in the file of this patent

UNITED STATES PATENTS

| | | |
|---|---|---|
| 1,884,299 | Searles | Oct. 25, 1932 |
| 2,044,663 | Brodin | June 16, 1936 |
| 2,227,064 | Bryant | Dec. 31, 1940 |
| 2,280,385 | Dickson | Apr. 21, 1942 |